United States Patent
Watanabe et al.

(10) Patent No.: US 10,554,946 B2
(45) Date of Patent: Feb. 4, 2020

(54) IMAGE PROCESSING FOR DYNAMIC OSD IMAGE

(71) Applicant: SONY CORPORATION, Tokyo (JP)

(72) Inventors: Keisuke Watanabe, Tokyo (JP); Akira Shimizu, Saitama (JP)

(73) Assignee: SONY CORPORATION, Tokyo (JP)

( * ) Notice: Subject to any disclaimer, the term of this patent is extended or adjusted under 35 U.S.C. 154(b) by 154 days.

(21) Appl. No.: 14/220,868

(22) Filed: Mar. 20, 2014

(65) Prior Publication Data

US 2014/0300638 A1  Oct. 9, 2014

(30) Foreign Application Priority Data

Apr. 9, 2013  (JP) .................................. 2013-081024

(51) Int. Cl.
*H04N 13/122* (2018.01)

(52) U.S. Cl.
CPC ................................ *H04N 13/122* (2018.05)

(58) Field of Classification Search
CPC ........... H04N 13/0018; H04N 13/0438; H04N 13/007; H04N 13/004; H04N 13/0007; H04N 13/122; H04N 13/156; H04N 13/183; H04N 13/341; G06T 2207/10021
USPC .................. 345/634, 156; 382/264
See application file for complete search history.

(56) References Cited

U.S. PATENT DOCUMENTS

| | | | |
|---|---|---|---|
| 5,917,937 A | 6/1999 | Szeliski et al. | |
| 2004/0145599 A1* | 7/2004 | Taoka et al. | 345/698 |
| 2005/0047651 A1* | 3/2005 | Zheng | G06T 3/4038 382/162 |
| 2005/0162557 A1 | 7/2005 | Choi | |
| 2007/0236493 A1* | 10/2007 | Horiuchi | H04N 13/341 345/419 |
| 2009/0060026 A1 | 3/2009 | Park et al. | |
| 2009/0284584 A1* | 11/2009 | Wakabayashi | H04N 13/007 348/44 |
| 2010/0265315 A1 | 10/2010 | Okuda et al. | |
| 2011/0012899 A1* | 1/2011 | Inoue | G06T 5/009 345/419 |
| 2012/0038641 A1* | 2/2012 | Levantovsky | H04N 13/004 345/424 |
| 2012/0050309 A1* | 3/2012 | Tsuchida | G09G 5/377 345/592 |

(Continued)

FOREIGN PATENT DOCUMENTS

JP  2002-197453 A  7/2002

OTHER PUBLICATIONS

Extended European Search Report dated Jul. 29, 2014 in patent application No. 14162878.4.

(Continued)

*Primary Examiner* — Ke Xiao
*Assistant Examiner* — Kim Thanh T Tran
(74) *Attorney, Agent, or Firm* — Chip Law Group

(57) ABSTRACT

An image processing device includes: a sub-image generation section, the sub-image generation section configured to generate a third sub-image by providing a peripheral image including at least a first region that is a transparent region around a first sub-image and to perform a filtering process on the entire or a part of a second sub-image including the first sub-image and the peripheral image; and a composition section configured to composite together a frame image and the third sub-image.

12 Claims, 15 Drawing Sheets

(56) References Cited

U.S. PATENT DOCUMENTS

| | | | |
|---|---|---|---|
| 2012/0050468 A1* | 3/2012 | Takahashi | H04N 13/0059 |
| | | | 348/43 |
| 2012/0120190 A1* | 5/2012 | Lee | 348/43 |
| 2012/0140029 A1* | 6/2012 | Yamazaki | H04N 13/0022 |
| | | | 348/43 |
| 2012/0154530 A1 | 6/2012 | Yamada | |
| 2012/0229599 A1* | 9/2012 | Fukuyama | 348/42 |

OTHER PUBLICATIONS

European Office Action dated Jul. 17, 2015 in patent application No. 14162878.4.

* cited by examiner

IMAGE PROCESSING FOR DYNAMIC OSD IMAGE

CROSS REFERENCE TO RELATED APPLICATION

This application claims the benefit of Japanese Priority Patent Application JP 2013-081024 filed on Apr. 9, 2013, the entire contents of which are incorporated herein by reference.

BACKGROUND

The present disclosure relates to an image processing device having a function of generating an OSD image, an image processing method, a display, and an electronic apparatus.

Various pieces of information such as, for example, information for data broadcasting, subtitle information and so forth other than existing voice information and image information are supplied over broadcast waves with change in system of television broadcasting from analog broadcasting to digital broadcasting. The information for data broadcasting and the subtitle information may be superimposed on image information such as, for example, a television program and so forth and displayed as a so-called OSD (On Screen Display) images on a display.

Incidentally, various methods are proposed as a method of compositing together a plurality of images. For example, Japanese Unexamined Patent Application Publication No. 2002-197453 discloses a method of extracting a partial image from a certain image and, when attaching the partial image to another image, erasing information of boundary pixels of the image to which the partial image is to be attached.

SUMMARY

The OSD image may be displayed while being dynamically changed, that is, while being moved and/or scaled up/down in some cases. It is preferable for an observer to observe the change with no discomfort and it is desirable to implement such a high image quality even in the above-mentioned case.

It is desirable to provide an image processing device, an image processing method, a display, and electronic apparatus making it possible to attain the high image quality regardless of dynamic change of the OSD image.

According to an embodiment of the present disclosure, there is provided an image processing device, including: a sub-image generation section, the sub-image generation section configured to generate a third sub-image by providing a peripheral image including at least a first region that is a transparent region around a first sub-image and to perform a filtering process on the entire or a part of a second sub-image including the first sub-image and the peripheral image; and a composition section configured to composite together a frame image and the third sub-image.

According to an embodiment of the present disclosure, there is provided an image processing method, including: generating a third sub-image by providing a peripheral image including at least a first region that is a transparent region around a first sub-image and performing a filtering process on the entire or a part of a second sub-image including the first sub-image and the peripheral image; and compositing together a frame image and the third sub-image.

According to an embodiment of the present disclosure, there is provided a display, including: an image processing section; and a display section displaying an image processed by the image processing section, wherein the image processing section includes a sub-image generation section, the sub-image generation section configured to generate a third sub-image by providing a peripheral image including at least a first region that is a transparent region around a first sub-image and to perform a filtering process on the entire or a part of a second sub-image including the first sub-image and the peripheral image; and a composition section configured to composite together a frame image and the third sub-image.

According to an embodiment of the present disclosure, there is provided an electronic apparatus, including: an image processing section; and a control section controlling the operation of the image processing section, wherein the image processing section includes a sub-image generation section, the sub-image generation section configured to generate a third sub-image by providing a peripheral image including at least a first region that is a transparent region around a first sub-image and to perform a filtering process on the entire or a part of a second sub-image including the first sub-image and the peripheral image; and a composition section configured to composite together a frame image and the third sub-image. A television apparatus, a head-mounted display, a personal computer, a game machine and so forth may correspond to the above-mentioned electronic apparatus.

In the image processing device, image processing method, display and electronic apparatus according to the embodiments of the present disclosure, the frame image and the third sub-image are mutually superimposed and composited. In the above-mentioned case, the third sub-image is generated by performing the filtering process on the entire or the part of the second sub-image including the first sub-image and the peripheral image including at least the first region that is the transparent region.

According to the image processing device, image processing method, display, and electronic apparatus according to the embodiments of the present disclosure, since the peripheral image including at least the first region that is the transparent region is provided around the first sub-image, and the filtering process is performed on the second-sub image including the first sub-image and the peripheral image, it becomes possible to attain the high image quality.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
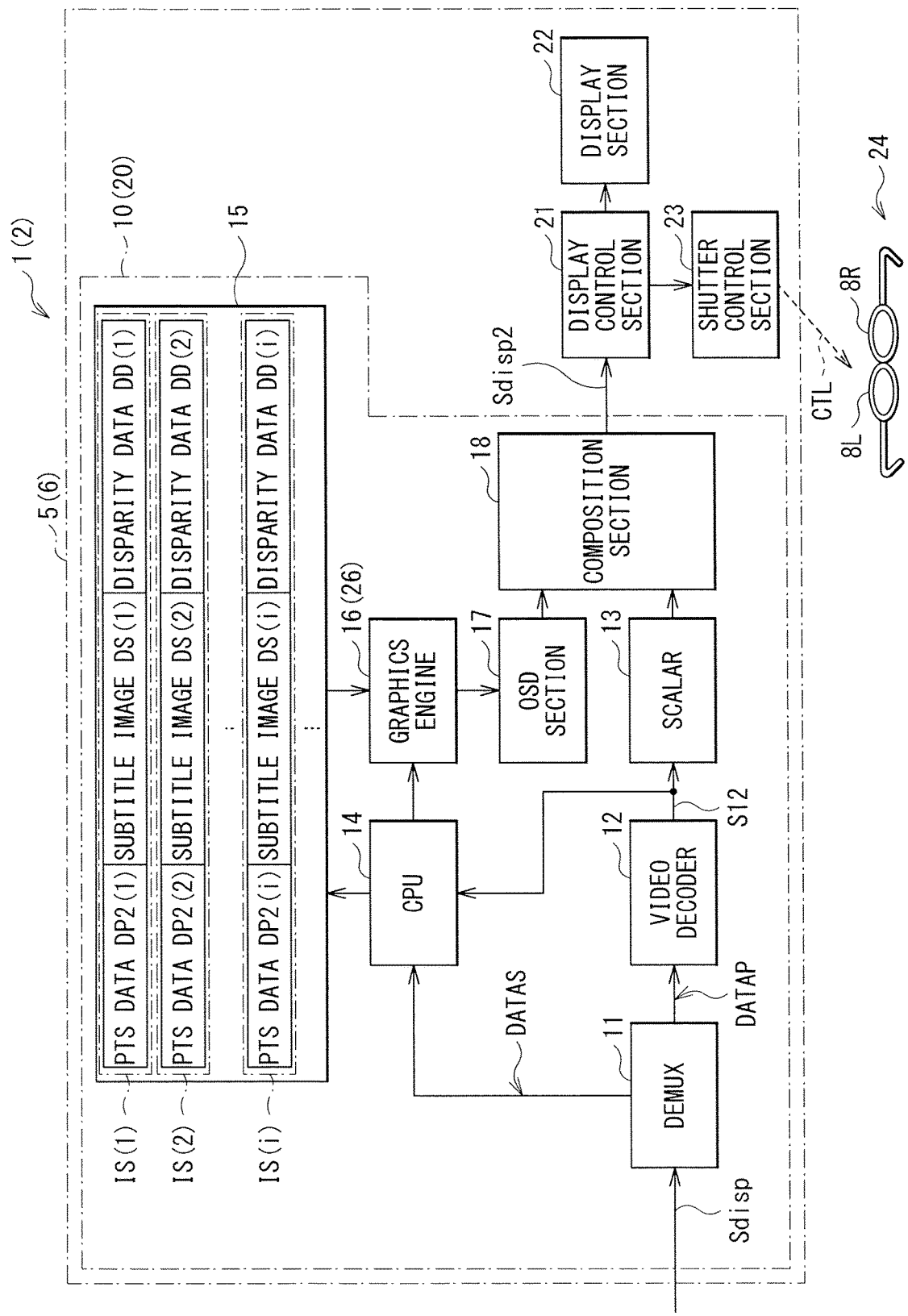
FIG. 1 is a block diagram illustrating a configuration example of a display system according to an embodiment of the present disclosure.

In the following, embodiments of the present disclosure will be described in detail with reference to the accompanying drawings. It is to be noted that description will be made in the following order.
1. First Embodiment
2. Second Embodiment
3. Application Example 1. First Embodiment Configuration Example General Configuration Example FIG. 1 illustrates a configuration example of a display system according to a first embodiment of the present disclosure. A display system 1 is a display system adapted to perform stereoscopic display. It is to be noted that since the image display device, image display method, and display according to the embodiments of the present disclosure are embodied by the present embodiment, description thereof will be made together with description of the display system.

The display system 1 includes a display 5 and a pair of shutter spectacles 24. The display 5 includes an image processing section 10, a display control section 21, a display section 22, and a shutter control section 23.

The image processing section 10 is adapted to perform predetermined image processing on a supplied image signal Sdisp and generate and output an image signal Sdisp2. Specifically, the image processing section 10 is configured to extract subtitle data from the image signal Sdisp, to generate a left eye subtitle image DSL and a right eye subtitle image DSR on the basis of a subtitle image DS and so forth included in the subtitle data, and to superimpose the left eye subtitle image DSL on a left eye image PL and the right eye subtitle image DSR on a right eye image PR as OSD (On Screen Display) images as will be described later.

The display control section 21 is adapted to control operations of the display section 22 and the shutter control section 23 on the basis of the image signal Sdisp2. The display section 22 is adapted to display an image on the basis of control by the display control section 21. Specifically, the display section 22 is configured to alternately display the left eye image PL and the right eye image PR in time division as will be described later.

The shutter control section 23 is adapted to generate a shutter control signal CTL on the basis of control by the display control section 21 and to transmit the shutter control signal CTL to the pair of shutter glasses 24 by radio communication. It is to be noted that although in this example, the shutter control section 23 is configured to supply the shutter control signal CTL by radio communication, the configuration of the shutter control section 23 is not limited to this and the shutter control section 23 may be configured to supply the shutter control signal CTL, for example, by cable communication.

The pair of shutter spectacles 24 is a spectacle-type shutter device and allows stereoscopic view when an observer uses the pair of shutter spectacles 24. The pair of shutter spectacles 24 includes a left eye shutter 8L and a right eye shutter 8R. The left eye shutter 8L and the right eye shutter 8R are configured by liquid crystal shutters in this example. The left eye shutter 8L and the right eye shutter 8R are configured such that light transmitting states (open states) and light shielding states (closed states) of the shutters 8L and 8R are controlled with the shutter control signal CTL supplied from the shutter control section 23.

Figure 2A:
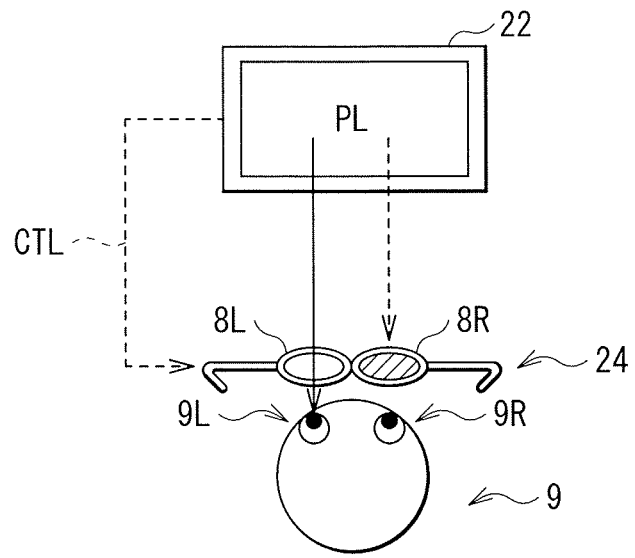
FIG. 2A is a schematic diagram illustrating one state of a displaying operation of the display system illustrated in FIG. 1.
Figure 2B:
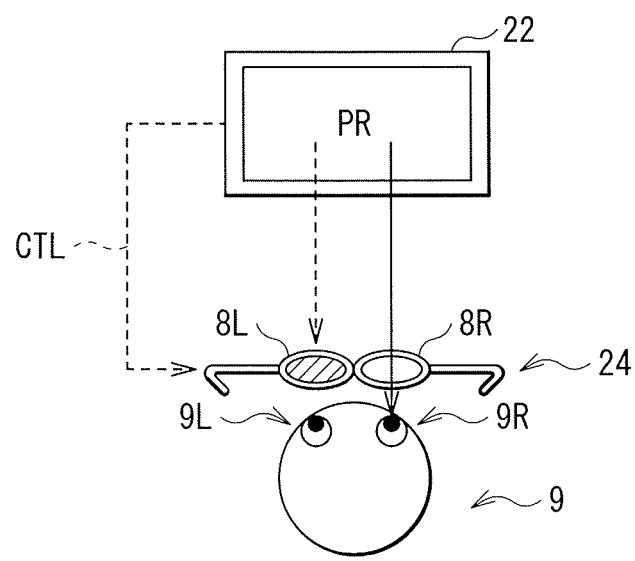
FIG. 2B is a schematic diagram illustrating another state of the displaying operation of the display system illustrated in FIG. 1.

FIG. 2A and FIG. 2B schematically illustrate operational examples of the display section 22 and the pair of shutter spectacles 24. FIG. 2A illustrates the example of the operation performed when the left eye image PL is displayed and FIG. 2B illustrates the example of the operation performed when the right eye image PR is displayed. When the display section 22 is displaying the left eye image PL, the left eye shutter 8L enters the open state and the right eye shutter 8R enters the closed state in the pair of shutter spectacles 24 as illustrated in FIG. 2A. At that time, an observer 9 watches the left eye image PL with his/her left eye 9L. On the other hand, when the display section 22 is displaying the right eye image PR, the left eye shutter 8L enters the closed state and the right eye shutter 8R enters the open state in the pair of shutter spectacles 24 as illustrated in FIG. 2B. At that time, the observer 9 watches the right eye image PR with his/her right eye 9R. When the above-mentioned operations are repetitively performed alternatively, it becomes possible for the observer 9 to recognize a picture configured by a series of these images as a deep and three-dimensional picture with the aid of a parallax (disparity) between the left eye image PL and the right eye image PR.

(Image Processing Section 10)

In the following, a configuration of the image processing section 10 will be described in detail. The image signal Sdisp is supplied to the image processing section 10. The image signal Sdisp is an image signal for digital broadcasting and is stream data including image data DATAP, voice data DATAA, subtitle data DATAS and so forth. The image data DATAP, the voice data DATAA, the subtitle data DATAS and so forth are configured to be respectively encoded and packetized and to be supplied to the image processing section 10 as a so-called PES (Packetized Elementary Stream).

The image data DATAP includes the left eye image PL, the right eye image PR, PTS (Presentation Time Stamp) data DP1 and so forth and may be encoded, for example, by an MPEG-2 encoding system. The PTS data DP1 indicates a time stamp of each of the left eye image PL and the right eye image PR in a series of images.

The subtitle data DATAS includes a subtitle image DS, disparity data DD, PTS data DP2 and so forth. The subtitle image DS may include luminance information IR, IG, and IB of three colors of red (R), green (G), and blue (B) and information on transparency α, for example, per pixel. Here, the transparency α may be, for example, 8-bit information (0 to 255) and indicates that the lower the value is, the more transparent the image concerned is. The disparity data DD is a parameter that indicates a degree of three-dimensionality when the subtitle image DS is to be displayed three-dimensionally as will be described later. The PTS data DP2 indicates the time stamp of the subtitle image DS.

Figure 3A:
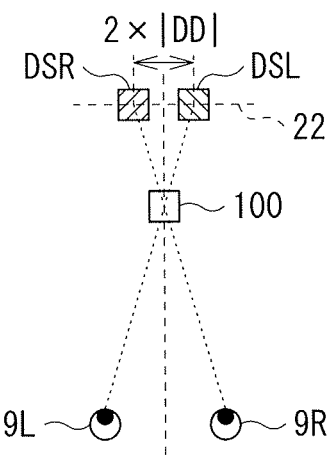
FIG. 3A is a schematic diagram illustrating an example of stereoscopic display of the display system illustrated in FIG. 1.
Figure 3B:
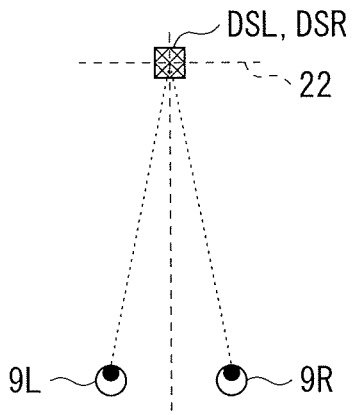
FIG. 3B is a schematic diagram illustrating another example of the stereoscopic display of the display system illustrated in FIG. 1.
Figure 3C:
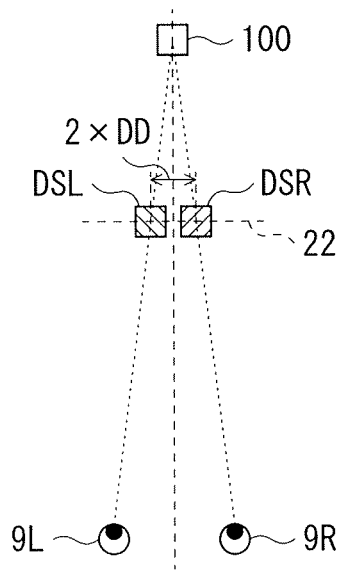
FIG. 3C is a schematic diagram illustrating still another example of the stereoscopic display of the display system illustrated in FIG. 1.

FIG. 3A to FIG. 3C schematically illustrate a relation between the disparity data DD and the degree of three-dimensionality. FIG. 3A illustrates the relation when the disparity data DD has a negative value (DD<0), FIG. 3B illustrates the relation when the disparity data DD is "0" (DD=0), and FIG. 3C illustrates the relation when the disparity data DD has a positive value (DD>0). The left eye subtitle image DSL is a subtitle image that the observer 9 observes with the left eye 9L and the right eye subtitle image DSR is a subtitle image that the observer 9 observes with the right eye 9R. The left eye subtitle image DSL and the right eye subtitle image DSR are displayed at mutually displaced positions in a horizontal direction in accordance with the disparity data DD as described hereinafter.

When the disparity data DD has the negative value (DD<0), the left eye subtitle image DSL is displayed on the right side of the right eye subtitle image DSR viewing from the position of the observer 9 as illustrated in FIG. 3A. In the example in FIG. 3A, a displacement amount between display positions of the left eye subtitle image DSL and the right eye subtitle image DSR is two times (2×|DD|) as large as an absolute value of the disparity data DD. In this case, the observer 9 feels as if a subtitle image (a three-dimensional subtitle image 100) is displayed on the front side of a display surface (a display screen) of the display section 22.

In addition, when the disparity data DD is "0" (DD=0), the left eye subtitle image DSL and the right eye subtitle image DSR are displayed on the same position as illustrated in FIG. 3B. In this case, the observer 9 feels as if the subtitle image is displayed on the display surface of the display section 22.

In addition, when the disparity data DD has the positive value (DD>0), the left eye subtitle image DSL is displayed on the left side of the right eye subtitle image DSR viewing from the position of the observer 9 as illustrated in FIG. 3C. In the example in FIG. 3C, the displacement amount between the display positions of the left eye subtitle image DSL and the right eye subtitle image DSR is two times (2×DD) as large as a value of the disparity data DD. In this case, the observer 9 feels as if the subtitle image (the three-dimensional subtitle image 100) is displayed on the back side of the display surface of the display section 22.

The display system 1 is configured to perform stereoscopic display of the subtitle image at the degree of three-dimensionality according to the disparity data DD as described above.

The image processing section 10 includes a DEMUX 11, a video decoder 12, a scalar 13, a CPU (Central Processing Unit) 14, a memory 15, a graphics engine 16, an OSD processing section 17, and a composition section 18.

The DEMUX 11 is adapted to separate and extract the image data DATAP, the voice data DATAA, and the subtitle data DATAS from the supplied image data Sdisp. Then, the DEMUX 11 is configured to supply the image data DATAP to the video decoder 12, to supply the voice data DATAA to a not-illustrated voice processing section, and to supply the subtitle data DATAS to the CPU 14.

The video decoder 12 is adapted to decode the image data DATAP supplied from the DEMUX 11 and to supply the left eye image PL, the right eye image PR, and the PTS data DP1 included in the image data DATAP to the scalar 13 as a signal S12.

The scalar 13 is adapted to scale the left eye image PL and the right eye image PR so as to match the resolution of the display section 22 and to output the images so scaled to the display section 22. That is, since the resolutions of the left eye image PL and the right eye image PR included in the image signal Sdisp do not typically match the resolution of the display section 22, the scalar 13 is configured to scale the left eye image PL and the right eye image PR such that the resolutions of the images PL and PR match the resolution of the display section 22.

The CPU 14 is adapted to control so as to store the subtitle image DS, the disparity data DD, and the PTS data DP2 included in the subtitle data DATAS supplied from the DEMUX 11 as one set of subtitle information IS into the memory 15. In addition, the CPU 14 also has a function of monitoring the PTS data DP1 included in the signal S12 output from the video decoder 12 and instructing the graphics engine 16 to generate the left eye subtitle image DSL and the right eye subtitle image DSR on the basis of the subtitle information IS when the PTS data DP1 matches any of the PTS data DP2 in the subtitle information IS stored in the memory 15. Thus, the left eye image PL and the left eye subtitle image DSL that have the same time stamp are composited together and the right eye image PR and the right eye subtitle image DSR that have the same time stamp are also composited together in the composition section 18 as will be described later.

The memory 15 is adapted to store the subtitle image DS, the disparity data DD, and the PTS data DP2 as one set of the subtitle information IS every time the above-mentioned pieces of data DS, DD, and DP2 are supplied from the CPU 14. The memory 15 is configured to store a plurality of pieces of subtitle information IS(i) (i; a natural number). Here, each of the plurality of pieces of subtitle information IS(i) is configured by each of a plurality of subtitle images DS(i), each of a plurality pieces of disparity data DD(i), and each of a plurality of pieces of PTS data DP2(i). In addition, the memory 15 also functions as a working region for the CPU 14, the graphics engine 16 and so forth.

The graphics engine 16 reads out the subtitle information IS from the memory 15 and generates the left eye subtitle image DSL and the right eye subtitle image DSR on the basis of an instruction from the CPU 14. Specifically, the graphic engine 16 generates subtitle information DS2 including the subtitle information DS in a part of an image region on the basis of the subtitle image DS included in the subtitle information IS. Then, the graphics engine 16 generates the left eye subtitle image DSL and the right eye subtitle image DSR by performing a filtering process on the subtitle image DS2 on the basis of the disparity data DD included in the subtitle information IS. In the following, details thereof will be described.

Figure 4A:
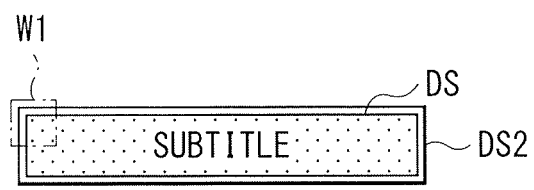
FIG. 4A is an explanatory diagram illustrating an operation of a graphics engine illustrated in FIG. 1.
Figure 4B:
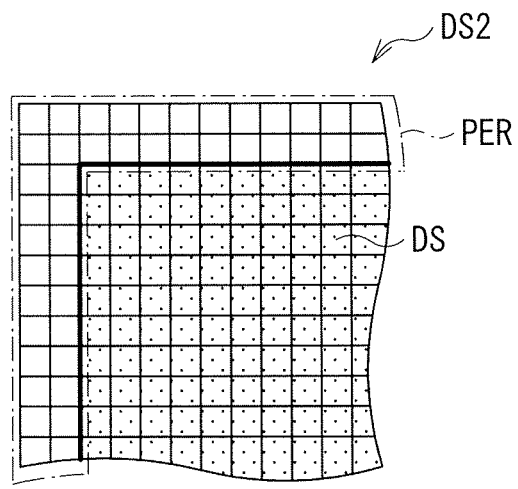
FIG. 4B is an explanatory diagram illustrating another operation of the graphics engine illustrated in FIG. 1.

FIG. 4A illustrates the subtitle image DS2 and FIG. 4B illustrates an image portion W1 in FIG. 4A. First, the graphics engine 16 generates the subtitle image DS2 on the basis of the subtitle image DS. The subtitle image DS2 includes the subtitle information DS in the part of the image region and is an image formed by expanding the subtitle image DS vertically and horizontally each by an amount of two pixels (a peripheral image PER) in the example in FIG. 4B. In the peripheral image PER, all pieces of the luminance information IR, IG, and IB are set to "0s" (zeroes) and the transparency α is set to "0" in all of the pixels in the example illustrated in FIG. 4B. That is, the peripheral image PER is a transparent image. It is to be noted that value setting is not limited to the above and, for example, the luminance information IR, IG, and IB may be set to low values other than "0s" and the transparency α may be also set to a low value (a value indicating high transparency) other than "0".

Figure 5:
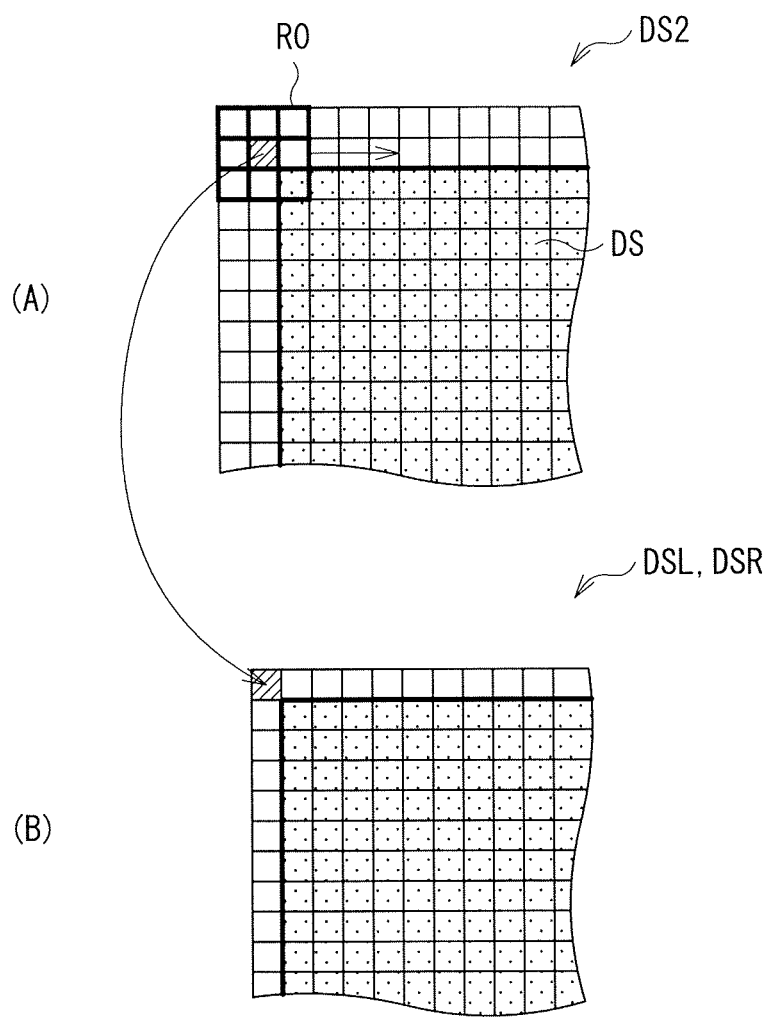
FIG. 5 is an explanatory diagram illustrating still another operation of the graphics engine illustrated in FIG. 1.

Then, the graphics engine 16 generates the left eye subtitle image DSL and the right eye subtitle image DSR by performing the filtering process on the subtitle image DS2 as will be described hereinafter (A) of FIG. 5 schematically illustrates the filtering process to be performed on the subtitle image DS2 and (B) of FIG. 5 schematically illustrates the left eye subtitle image DSL and the right eye subtitle image DSR generated by performing the filtering process. In the example, the graphics engine 16 performs the filtering process on the subtitle image DS2 using a 3×3 FIR (Finite impulse response) filter. The FIR filter functions as a low-pass filter. The graphics engine 16 performs the filtering process on each of maps of the luminance information IR, IG, and IB and the transparency α of the subtitle image DS2. Specifically, the graphics engine 16 sets a 3×3 arithmetically operated region RO in the subtitle image DS2 and mixes together nine pieces of the luminance information IR in the arithmetically operated region RO at a mixture ratio indicated by nine filter factors of the FIR filter ((A) of FIG. 5). Then, the result of arithmetic operation is set as the luminance information IR of the coordinates of the left eye subtitle image DSL and the right eye subtitle image DSR corresponding to the coordinates of the central part of the 3×3 arithmetically operated region RO (a shaded part in (B) of FIG. 5). Then, the graphics engine 16 repetitively performs this arithmetic operation on all of the regions of the subtitle image DS2 while shifting the arithmetically operated region RO pixel by pixel. The graphics engine 16 performs such a filtering process on each of the maps of the luminance information IR, IG, and IB and the transparency α. As a result of the filtering process so performed, each of the left eye subtitle image DSL and the right eye subtitle image DSR is formed as an image that is made wider than the subtitle image DS vertically and horizontally each by the amount of one pixel in this example as illustrated in (B) of FIG. 5.

The graphics engine 16 generates the left eye subtitle image DSL and the right eye subtitle image DSR that are mutually displaced horizontally on the basis the disparity data DD included in the subtitle information IS by performing the filtering process. At that time, the graphics engine 16 changes the mixture ratio of the respective pieces of the luminance information IR, IG, and IB and the transparency α in the arithmetically operated region RO by switching the filter factor on the basis of the disparity data DD included in the subtitle information IS. As a result, it may become possible for the graphics engine 16 to generate the left eye subtitle image DSL and the right eye subtitle image DSR by shifting the subtitle image DS2 not by the amount of one pixel but by, for example, the amount of 0.5 pixels each time as described hereinafter.

Figure 6:
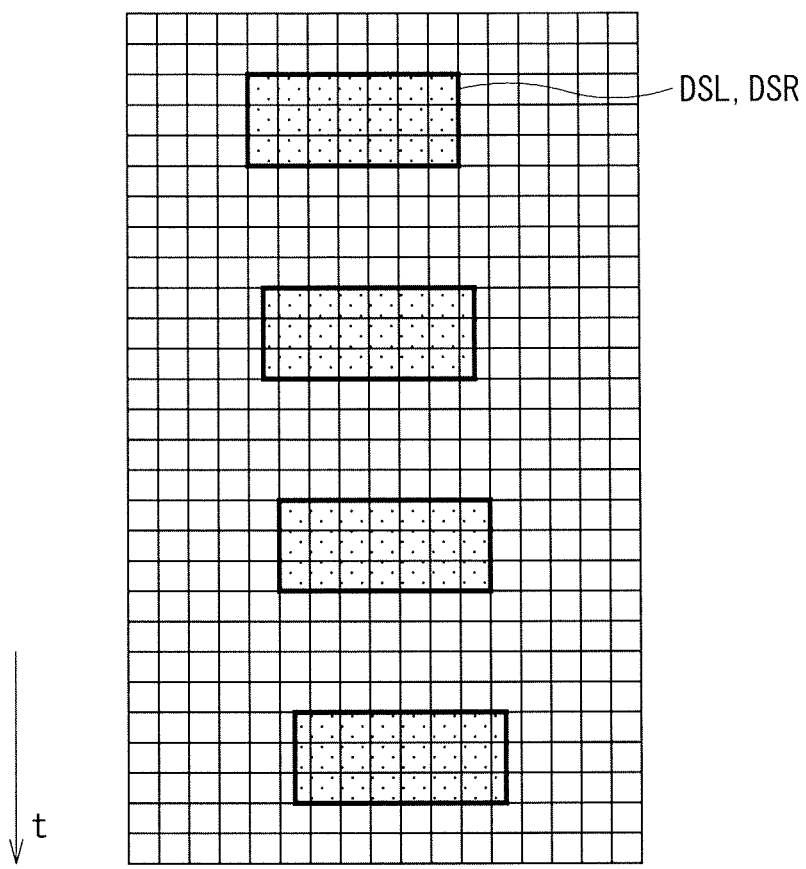
FIG. 6 is an explanatory diagram illustrating still another operation of the graphics engine illustrated in FIG. 1.

FIG. 6 illustrates the display positions of the left eye subtitle image DSL and the right eye subtitle image DSR on the display section 22. The display positions of the left eye subtitle image DSL and the right eye subtitle image DSR are adjusted on the basis of the disparity data DD as illustrated in FIG. 3A to FIG. 3C. In the example illustrated in FIG. 6, the display positions are changed with dynamically changing the disparity data DD. At that time, it may be sometimes desired to displace the display position more finely than pixel-based displacement. In the example in FIG. 6, the display position is displaced by the amount of 0.5 pixels each time. The graphics engine 16 is configured to allow so-called phase adjustment that the left eye subtitle image DSL may be displaced leftward by the amount of 0.5 pixels and the right eye subtitle image DSR may be displaced rightward by the amount of 0.5 pixels, for example, by setting the 3×3 filter factors asymmetrically in the horizontal direction in such a case.

In addition, it becomes possible for the graphics engine 16 to perform the above-mentioned phase adjustment and to make changing of the luminance information IR, IG, and IB and the transparency α of each of the left eye subtitle image DSL and the right eye subtitle image DSR smoother by performing the filtering process. As a result, since the outlines of the left eye subtitle image DSL and the right eye subtitle image DSR get blurred, the observer 9 feels as if the degree of three-dimensionality is changed more smoothly even when the disparity data DD of the subtitle image DS is changed and the left eye subtitle image DSL and the right eye subtitle image DSR are moved in the display screen accordingly as will be described later.

The graphics engine 16 generates the left eye subtitle image DSL and the right eye subtitle image DSR on the basis of the subtitle image DS and the disparity data DD in this way. Specifically, when the disparity data DD has the positive value (DD>0) (FIG. 3C), the graphics engine 16 performs the filtering process so as to displace the left eye subtitle image DSL leftward and displace the right eye subtitle image DSR rightward by the amount of the value of the disparity data DD. In addition, when the disparity data DD has the negative value (DD<0) (FIG. 3A), the graphics engine 16 performs the filtering process so as to displace the left eye subtitle image DSL rightward and displace the right eye subtitle image DSR leftward by the amount of the absolute value (|DD|) of the disparity data DD.

The OSD section 17 is adapted to set the display positions of the left eye subtitle image DSL and the right eye subtitle image DSR that the graphics engine 16 has generated on the display screen. The OSD section 17 includes a plurality of layers (three layers L0 to L2 in the example in FIG. 7A to FIG. 7C) and is configured to arrange images to be superimposed and displayed respectively on the layers.

Figure 7A:
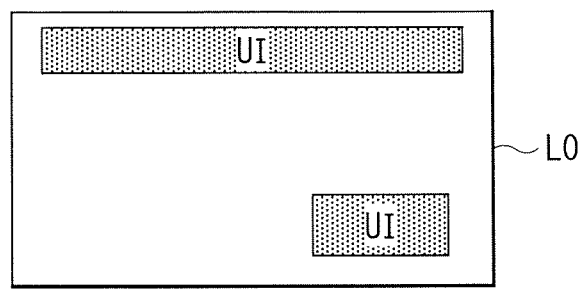
FIG. 7A is an explanatory diagram illustrating an example of a layer of an OSD section 17 illustrated in FIG. 1.
Figure 7B:
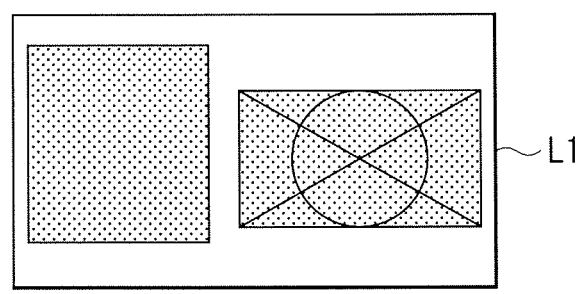
FIG. 7B is an explanatory diagram illustrating an example of another layer of the OSD section 17 illustrated in FIG. 1.
Figure 7C:
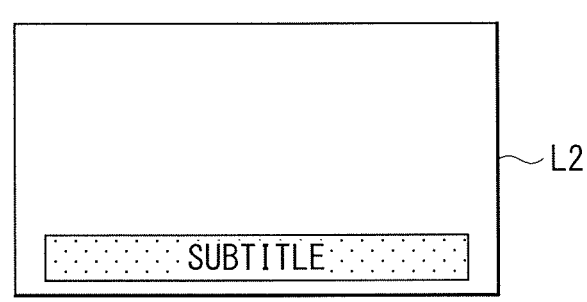
FIG. 7C is an explanatory diagram illustrating an example of still another layer of the OSD section 17 illustrated in FIG. 1.

FIG. 7A to FIG. 7C illustrate the layers L0 to L2 set by the OSD section 17. In the examples, the layer L0 is a layer for displaying a user interface of the display system 1, the layer L1 is a layer for displaying data broadcasting, and the layer L2 is a layer for displaying the left eye subtitle image DSL and the right eye subtitle image DSR. In the above-mentioned examples, the layer L0 is arranged on top of the layers and the remaining layers are arranged under the layer L0 in order of the layer L1 and the layer L2. The OSD section 17 arranges the left eye subtitle image DSL and the right eye subtitle image DSR on the layer L2 in this way. Then, the OSD section 17 is configured to supply the images on the layers L0 to L2 to the composition section 18.

The composition section 18 is adapted to mutually superimpose and composite each of the left eye image PL and the right eye image PR supplied from the scalar 13 and the images on the respective layers L0 to L2 supplied from the OSD section 17.

Figure 8A:
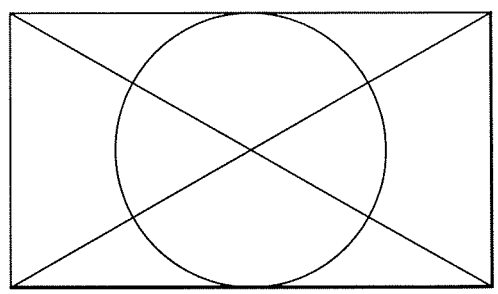
FIG. 8A is an explanatory diagram illustrating an image supplied from a scalar 13 illustrated in FIG. 1.
Figure 8B:
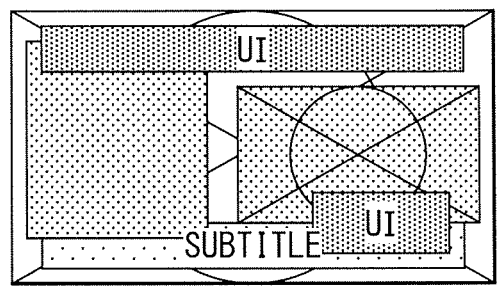
FIG. 8B is an explanatory diagram illustrating an image that a composition section illustrated in FIG. 1 has composited.

FIG. 8A illustrates an example of the image supplied from the scalar 13 and FIG. 8B illustrates an example of an image that the images on the respective layers L0 to L2 supplied from the OSD section 17 are superimposed on the image illustrated in FIG. 8A. The composition section 18 superimposes the images on the layers L0 to L2 on the front side of the image (the left eye image PL or the right eye image PR) supplied from the scalar 13 in this way. At that time, in the composition section 18, the images having the same time stamp are superimposed on each other. That is, the CPU 14 instructs the graphics engine 16 so as to generate the left eye subtitle image DSL and the right eye subtitle image DSR on the basis of the PTS data DP1 included in the signal S12 output from the video decoder 12 as described above. As a result, the PTS data DP1 for the left eye image PL and the right eye image PR comes to have the same stamp as the PTS data DP2 for the subtitle image DS that is the original image of the left eye subtitle image DSL and the right eye subtitle image DSR to be respectively superimposed on the images DSL and DSR. Then, the composition section 18 is configured to output the composited image as the image signal Sdisp2.

The image processing section 10 is configured to generate the left eye subtitle image DSL and the right eye subtitle image DSR on the basis of the subtitle information IS (the subtitle image DS, the disparity data DD, and the PTS data DP2) included in the image signal Sdisp, to superimpose the left eye subtitle image DSL on the left eye image PL, and to superimpose the right eye subtitle image DSR on the right eye image PR in this way.

Here, the graphics engine 16 corresponds to a specific example of a "sub-image generation section" in the embodiment of the present disclosure. The subtitle image DS corresponds to a specific example of a "first sub-image" in the embodiment of the present disclosure, the subtitle image DS2 corresponds to a specific example of a "second sub-image" in the embodiment of the present disclosure, and the left eye subtitle image DSL and the right eye subtitle image DSR correspond to a specific example of a "third sub-image" in the embodiment of the present disclosure.

[Operations and Functions]

The operations and functions of the display system 1 of the present embodiment will be described.

(Outline of General Operation)

First, the outline of the general operation of the display system 1 will be described with reference to FIG. 1 and so forth. In the image processing section 10, the DEMUX 11 separates and extracts the image data DATAP, the voice data DATAA, and the subtitle data DATAS from the image signal Sdisp. The video decoder 12 decodes the image data DATAP and outputs the left eye image PL, the right eye image PR, and the PTS data DP1 included in the image data DATAP as the signal S12. The scalar 13 scales the left eye image PL and the right eye image PR so as to make the resolutions of the images PR and PL match the resolution of the display section 22 and outputs the images so scaled. The CPU 14 controls to store the subtitle image DS, the disparity data DD, and the PTS data DP2 included in the subtitle data TADAS into the memory 15 as one set of subtitle information IS. In addition, the CPU 14 monitors the PTS data DP1 included in the signal S12, and when the PTS data DP1 matches any of the PTS data DP2 in the subtitle information IS stored in the memory 15, instructs the graphics engine 16 to generate the left eye subtitle image DSL and the right eye subtitle image DSR on the basis of the subtitle information IS. Every time the subtitle image DS, the disparity data DD, and the PTS data DP2 are supplied from the CPU 14, the memory 15 stores the above-mentioned data as the one set of subtitle information IS. The graphics engine 16 reads out the subtitle information IS from the memory 15 and generates the left eye subtitle image DSL and the right eye subtitle image DSR on the basis of the instruction from the CPU 14. Specifically, the graphics engine 16 generates the subtitle image DS2 including the subtitle image DS in the part of the image region on the basis of the subtitle image DS included in the subtitle information IS. Then, the graphics engine 16 generates the left eye subtitle image DSL and the right eye subtitle image DSR by performing the filtering process on the subtitle image DS2 on the basis of the disparity data DD included in the subtitle information IS. The OSD section 17 sets the display positions of the left eye subtitle image DSL and the right eye subtitle image DSR. The composition section 18 mutually superimposes each of the left eye image PL and the right eye image PR supplied from the scalar 13 and the images on the respective layers supplied from the OSD section 17. Specifically, the composition section 18 superimposes the left eye subtitle image DSL on the left eye image PL and superimposes the right eye subtitle image DSR on the right eye image PR. Then, the composition section 18 outputs the image so composited as the image signal Sdisp2.

The display control section 21 controls the operations of the display section 22 and the shutter control section 23 on the basis of the image signal Sdisp2. The display section 22 alternately displays the left image PL on which the left eye subtitle image DSL is superimposed and the right eye image PR on which the right eye subtitle image DSR is superimposed on the basis of control by the display control section 21. The shutter control section 23 generates the shutter control signal CTL and transmits the shutter control signal CTL so generated to the pair of shutter spectacles 24 by radio communication on the basis of control by the display control section 21. Each of the left eye shutter 8L and the right eye shutter 8R of the pair of shutter spectacles 24 turns into the transmitting state or the light shielding state in synchronization with display on the display section 22.

(Change in Degree of Three-Dimensionality in Subtitle Display)

In the following, the operation of the display system 1 when the three-dimensional subtitle image 100 is displayed while being dynamically changed as the image is moved from a deep part toward the front of the display screen will be described.

Figure 9:
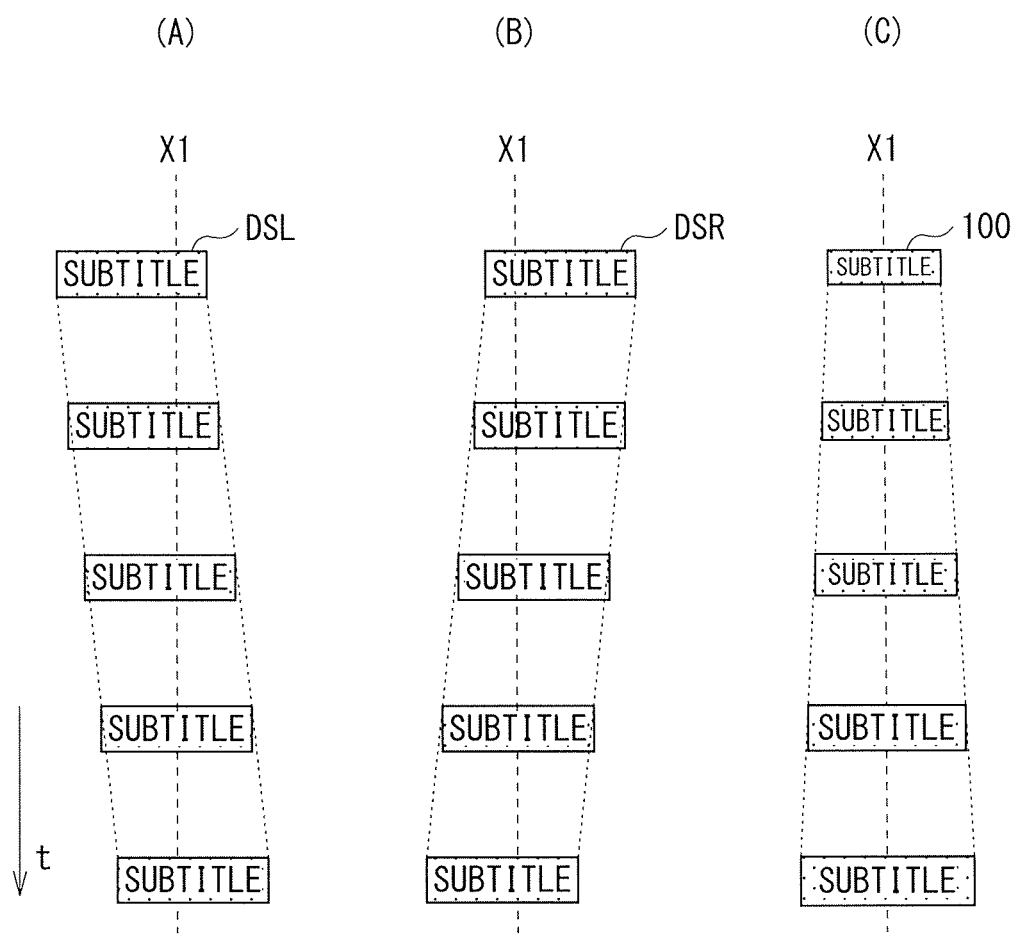
FIG. 9 is an explanatory diagram illustrating operational examples of the display system 1 illustrated in FIG. 1.
Figure 10:
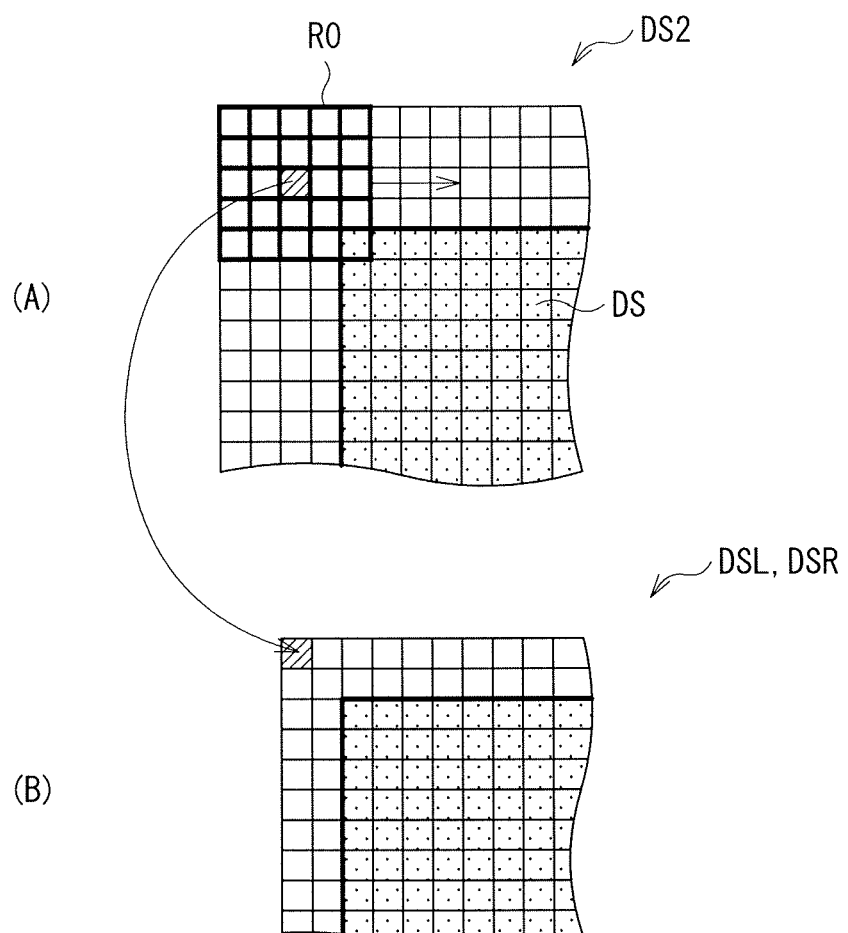
FIG. 10 is an explanatory diagram illustrating operational examples of a display system according to a modification example of the first embodiment.

FIG. 9 schematically illustrates an operational example of the display system 1, in which (A) illustrates the display position of the left eye subtitle image DSL, (B) illustrates the display position of the right eye subtitle image DSR, and (C) illustrates the display position of the three-dimensional subtitle image 100. In the examples in FIG. 9, the disparity data DD is gradually reduced with time and the left eye subtitle image DSL is moved rightward ((A) of FIG. 9) and the right eye subtitle image DSR is moved leftward ((B) of FIG. 9) accordingly. Thus, the observer 9 feels as if the three-dimensional subtitle image 100 pops up forward as illustrated in (C) of FIG. 9.

In performance of the series of above-mentioned operations, the left eye subtitle image DSL and the right eye subtitle image DSR are moved within the display screen as illustrated in (A) and (B) of FIG. 9. At that time, the graphics engine 16 generates the subtitle image DS2 by attaching the peripheral image PER to the subtitle image DS included in the subtitle information IS (FIG. 4A and FIG. 4B) and generates the left eye subtitle image DSL and the right eye subtitle image DSR by performing the filtering process on the subtitle image DS2 (FIG. 5). As a result, it becomes possible for the observer 9 to feel as if the degree of three-dimensionality changes more smoothly.

That is, for example, when the left eye subtitle image DSL and the right eye subtitle image DSR are generated by mutually displacing the subtitle images DS in opposite direction pixel by pixel, the observer 9 may possibly have a feeling that movement is discontinuous when the left eye subtitle image DSL and the right eye subtitle image DSR are moved within the display screen in accordance with change of the disparity data DD. That is, in this example, since, firstly, it may be difficult to displace the left eye subtitle image DSL and the right eye subtitle image DSR by an amount less than the amount of one pixel (for example, an amount of 0.5 pixels) and, secondarily, the filtering process is not performed in a state that the peripheral image PER is provided, the boundary between the left eye subtitle image DSL and a background image thereof and/or the boundary between the right eye subtitle image DSR and a background image thereof are/is clearly observed. It is thought that this (that the boundary is clearly observed) may become particularly noticeable when a difference in luminance between the left eye subtitle image DSL and the background image (the left eye image PL) and/or a difference in luminance between the right eye subtitle image DSR and the background image (the right eye image PR) are/is large. Therefore, the observer 9 may possibly have a feeling that movement of the left eye subtitle image DSL and the right eye subtitle image DSR is discontinuous. When the observer 9 feels as if the left eye subtitle image DSL and the right eye subtitle image DSR are moved discontinuously as mentioned above, the observer 9 may feel as if the degree of three-dimensionality is changed also discontinuously and may possibly feel strange.

On the other hand, in the display system 1, the left eye subtitle image DSL and the right eye subtitle image DSR are generated by generating the subtitle image DS2 by attaching the peripheral image PER that is set to "0" (zero) in each of the luminance information IR, IG, and IB and the transparency α to the subtitle image DS and performing the filtering process on the subtitle image DS2 while switching the filter factor (the mixture ratio) on the basis of the disparity data DD. Thus, firstly, it may become possible to move each of the left eye subtitle image DSL and the right eye subtitle image DSR not only by the amount of one pixel but also by the amount less than the amount of one pixel (for example, the amount of 0.5 pixels) each time. Then, secondarily, the outlines of the left eye subtitle image DSL and the right eye subtitle image DSR get blurred by performing the filtering process after the peripheral image PER has been provided. Therefore, the observer 9 feels as if the left eye subtitle image DSL and the right eye subtitle image DSR are moved more smoothly when these images DSL and DSR are moved within the display screen. As a result, the observer 9 has a feeling that changing of the degree of three-dimensionality is smoother than ever and therefore it becomes possible for the observer 9 to feel as if the degree of three-dimensionality changes more smoothly.

[Effects]

Since in the present embodiment, the peripheral image is attached to the subtitle image and the filtering process is performed on the subtitle image with the peripheral image attached, it becomes possible for the observer to feel as if the degree of three-dimensionality changes more smoothly and it becomes possible to attain the high image quality.

Modification Example 1-1

Although in the above-mentioned embodiment, the graphics engine 16 uses the 3×3 FIR filter, the present disclosure is not limited thereto. Alternatively, for example, an FIR filter having 2×2 or less taps or 4×4 or more taps may be used, or an FIR filter of a configuration that the number of taps in a vertical direction is different from the number of taps in a lateral direction may be used. However, since as the number of taps of the filter is increased, the load on arithmetic operation is increased and therefore the subtitle image may possibly get more blurred accordingly, for example, a filter configured by 3×3 taps, 5×5 taps, or 7×7 taps and so forth may be preferable.

Modification Example 1-2

Although in the above-mentioned embodiment, the graphics engine 16 generates the subtitle image DS2 by typically attaching the peripheral image PER that is set to "0" (zero) in each of the luminance information IR, IG, and IB and the transparency α to the subtitle image DS, the present disclosure is not limited thereto and, for example, an operation mode for performing an operation other than the above-mentioned operations may be included. In the following a display system 1B according to the present modification example will be described.

Figure 11:
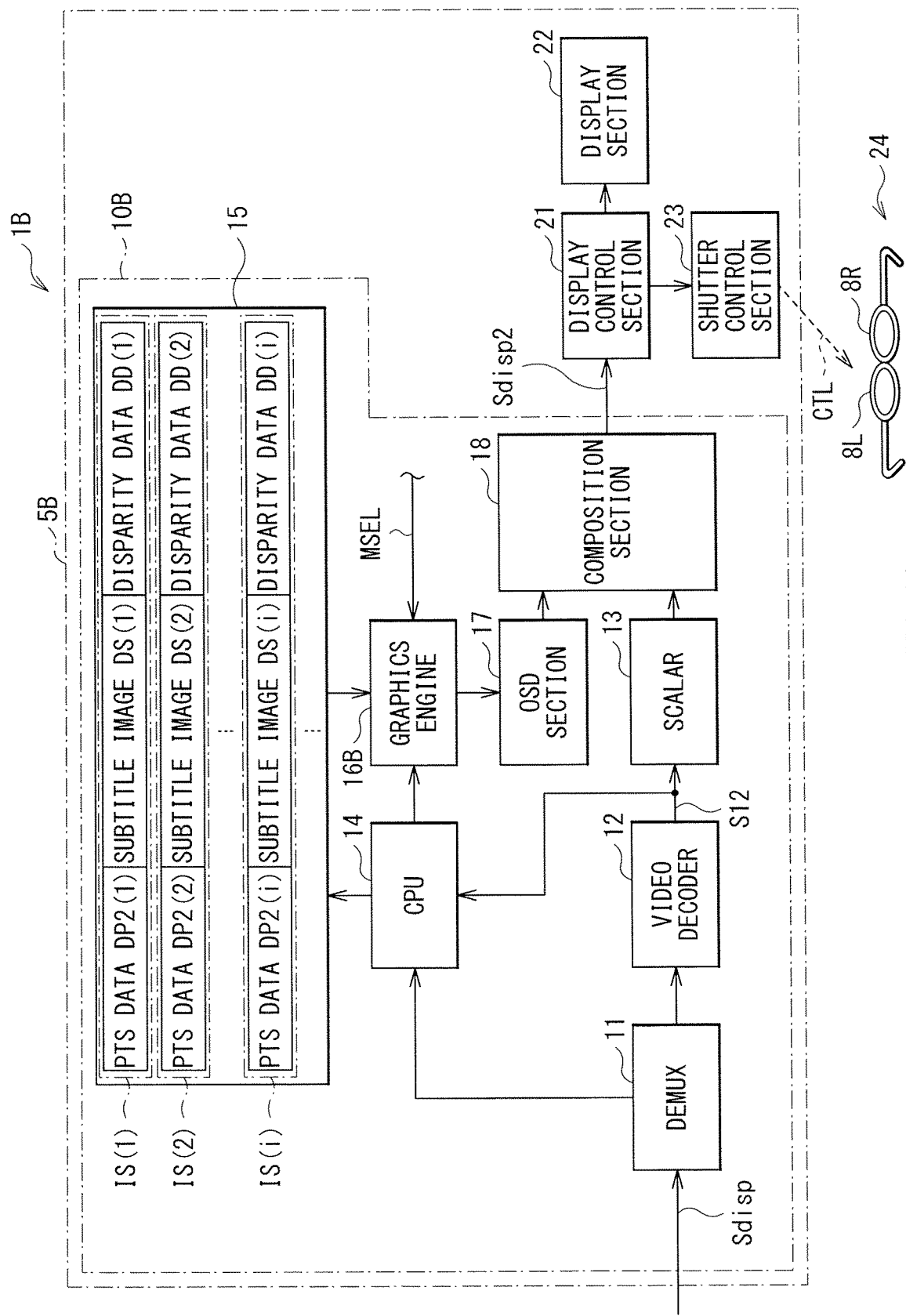
FIG. 11 is a block diagram illustrating a configuration example of a display system according to another modification example of the first embodiment.

FIG. 11 illustrates a configuration example of the display system 1B. The display system 1B includes a display section 5B including an image processing section 10B. The image processing section 10B includes a graphics engine 16B. The graphics engine 16B includes two operation modes M1 and M2 and is configured to select one operation mode concerned in accordance with an operation mode selection signal MSEL. In the operation mode M1, the graphics engine 16B performs the same operation as the graphics engine 16 according to the above-mentioned embodiment. On the other hand, in the operation mode M2, the graphics engine 16B performs an operation as follows.

Figure 12:
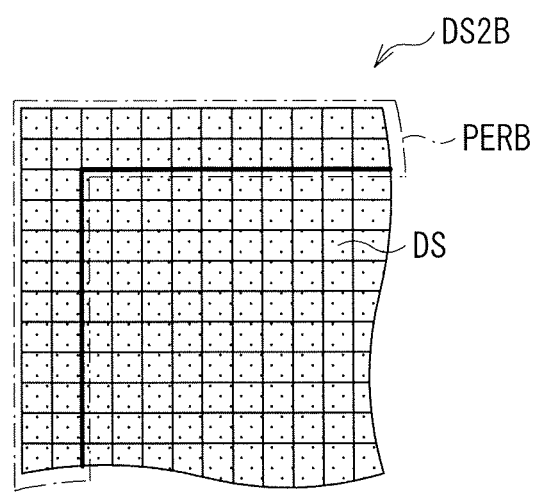
FIG. 12 is an explanatory diagram illustrating an operational example of a graphics engine according to another modification example of the first embodiment.

FIG. 12 illustrates the operation that the graphics engine 16B performs in the operation mode M2. In the operation mode M2, the graphics engine 16B generates a subtitle image DS2B by attaching a peripheral image PERB to the subtitle image DS. The peripheral image PERB includes the same information as the outermost luminance information IR, IG, and IB and transparency α of the subtitle image DS. Then, the graphics engine 16B is configured to generate the left eye subtitle image DSL and the right eye subtitle image DSR by performing the filtering process on the so generated subtitle image DS2. Thus, it becomes possible to reduce such a fear that undesirable information within the memory 15 may appear on a part of the subtitle image in the operation mode M2.

Modification Example 1-3

Figure 13:
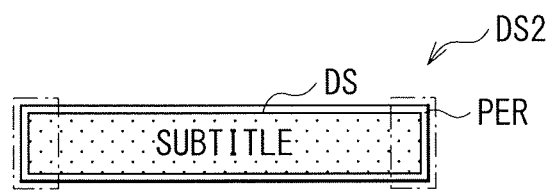
FIG. 13 is an explanatory diagram illustrating an operational example of a graphics engine according to still another modification example of the first embodiment.

Although in the above-mentioned embodiment, the filtering process is performed on the entire subtitle image DS, the present disclosure is not limited thereto. Alternatively, for example, the filtering process may be performed only on a part of the subtitle image DS2. Specifically, when the arithmetic capacity of the graphics engine 16 is low, the filtering process may be performed, for example, only on the vicinity of the peripheral image PER in the subtitle image DS2. Since the outlines of the left eye subtitle image DSL and the right eye subtitle image DSR get blurred also in the above-mentioned case, the observer may feel as if the degree of three-dimensionality is changed more smoothly. In addition, the graphics engine 16 may be configured to change a region to be subjected to the filtering process in accordance with a direction or directions that the left eye subtitle image DSL and/or the right eye subtitle image DSR are/is moved within the display screen. Specifically, for example, when the left eye subtitle image DSL and the right eye subtitle image DSR are moved in the lateral direction, the filtering process may be performed only on the left side vicinity and the right side vicinity of the peripheral image PER as illustrated in FIG. 13.

Modification Example 1-4

Although in the above-mentioned embodiment, the subtitle image DS to be included in the image signal Sdisp has been defined to the image that includes the information on the transparency α in addition to the luminance information IR, IG, and IB, the present disclosure is not limited thereto. Alternatively, for example, the subtitle image DS to be included in the image signal Sdisp may include only the luminance information IR, IG, and IB and the CPU 14 may give the transparency α per pixel of the subtitle image DS.

Modification Example 1-5

Although in the above-mentioned embodiment, each of the subtitle images DS to DS2 has been formed into a quadrilateral shape, the present disclosure is not limited thereto and any shape may be possible. Specifically, each of the images Ds to DS2 may have a shape that four corners of the quadrangle are rounded or may be circular or elliptical. In addition, the image may have the shape of a character or letter itself to be used for subtitle display.

Modification Example 1-6

Although in the above-mentioned embodiment, the subtitle image DS itself has been supplied in accordance with the image signal Sdisp, the present disclosure is not limited thereto. Alternatively, for example, a character code of a character to be used for subtitle display may be supplied in accordance with the image signal Sdisp and the CPU 14 may generate the subtitle image DS using the character code so supplied.

Modification Example 1-7

Although in the above-mentioned embodiment, the graphics engine 16 that is configured as hardware has generated the left eye subtitle image DSL and the right eye subtitle image DSR on the basis of the subtitle image DS and so forth, the present disclosure is not limited thereto. Alternatively, for example, the same function as the above may be implemented by software.

Modification Example 1-8

Although in the above-mentioned embodiment, a case that the left eye subtitle image DSL and the right eye subtitle image DSR are moved has been supposed, the present disclosure is not limited thereto and may be applied to various cases of dynamically changing, that is, for example, scaling up or down the image regions of the images DSL and DSR.

Modification Example 1-9

Although in the above-mentioned embodiment, the image processing section 10 has been configured to perform processing on the RGB signal configured by the luminance information IR, IG, and IB, the present disclosure is not limited thereto and the image processing section 10 may be configured to perform processing on a signal of another format. Specifically, for example, a YCbCr signal configured by a luminance signal Y and color difference signals Cb and Cr may be used. In this case, in the peripheral image PER, all of the luminance signals Y are set to "0s" and each of the color difference signals Cb and Cr may be set to, for example, "128" in 8-bit expression. It is to be noted that the values are not limited to the above-mentioned values and the luminance signal Y may be set to a low value other than "0".

Modification Example 1-10

Although in the above-mentioned embodiment, the graphics engine 16 has been configured to prepare the peripheral image PER in the memory region, the present disclosure is not limited thereto. Alternatively, for example, so-called end processing in the filtering process may be used. Specifically, although in the general end processing, the peripheral image PER is generated by copying the luminance information IR, IG, and IB and the transparency α at an end of the subtitle image DS, the peripheral image PER may be generated by copying transparent pixel information (the luminance information IR, IG, and IB and the transparency α are set to "0s" (zeroes) in place of the above.

2. Second Embodiment

In the following, a display system 2 according to the second embodiment will be described. In the present embodiment, the processing method to be performed by the graphics engine is replaced with another method when the subtitle image is adjacent to another subtitle image. It is to be noted that the same numerals are assigned to constitutional elements that are substantially the same as the elements of the display system 1 according to the first embodiment and description thereof is appropriately omitted.

As illustrated in FIG. 1, the display system 2 includes a display 6 that includes an image processing section 20. The image processing section 20 includes a graphics engine 26. The graphics engine 26 performs a process that is different from the process performed by the graphics engine 16 according to the first embodiment when the left eye subtitle image DSL and/or the right eye subtitle image DSR are/is adjacent to another subtitle image on the display screen.

Figure 14:
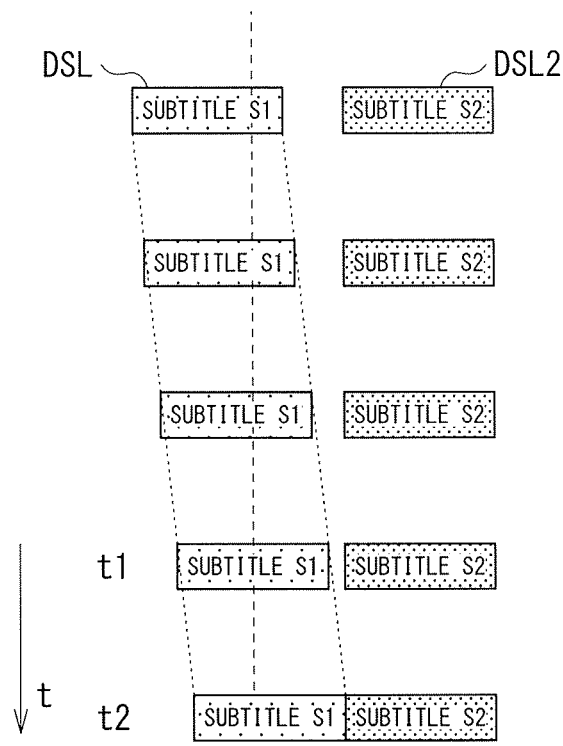
FIG. 14 is an explanatory diagram illustrating an operational example of a display system according to a second embodiment.

FIG. 14 illustrates an example that the degree of three-dimensionality of a subtitle S1 is changed and the degree of three-dimensionality of a subtitle S2 is not changed. In this example, the left eye subtitle image DSL moves in closer to another left eye subtitle image DSL2 and the left eye subtitle image DSL is adjacent to the left eye subtitle image DSL2 at a timing t2.

When it is expected that the left eye subtitle image DSL and/or the right eye subtitle image DSR will be adjacent to another subtitle image (in the example, the subtitle S2) as described above, the graphics engine 26 is configured to use a part of the above-mentioned another subtitle image in a peripheral image PER2.

Figure 15:
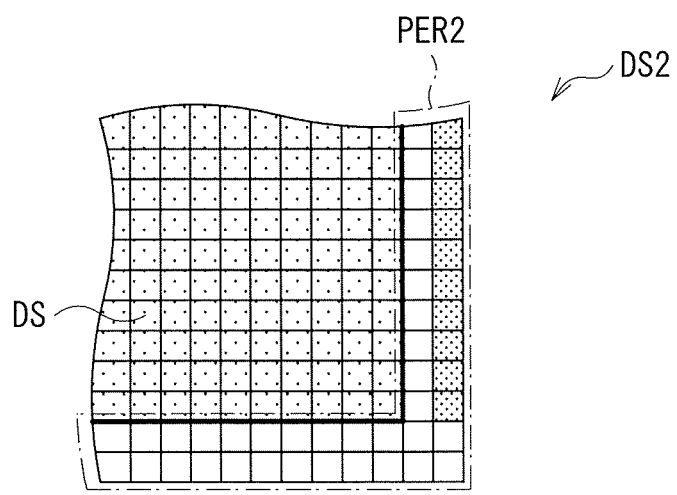
FIG. 15 is an explanatory diagram illustrating an operational example of a graphics engine according to the second embodiment.
Figure 16:
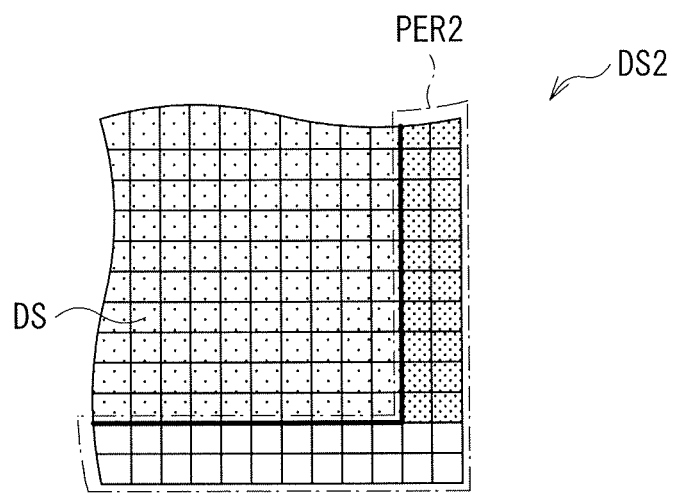
FIG. 16 is an explanatory diagram illustrating another operational example of the graphics engine according to the second embodiment.

FIG. 15 and FIG. 16 illustrate the peripheral image PER2 corresponding to timings t1 and t2 in FIG. 14. The graphics engine 26 sets the luminance information IR, IG, and IB and the transparency α of a part in a region of the peripheral image PER2 to be superimposed on an image region of the subtitle S2 to the same values as those of the luminance information IR, IG, and IB and the transparency α of the image region of the subtitle S2 on which the above-mentioned part is to be superimposed. In addition, with regard to a part other than the above-mentioned part in the region of the peripheral image PER2, the graphics engine 26 sets the luminance information IR, IG, and IB and the transparency α to "0s" (zeroes) as in the case in the above-mentioned first embodiment. Then, the graphics engine 26 generates the left eye subtitle image DSL and the right eye subtitle image DSR by performing the filtering process on the subtitle image DS2 that includes the subtitle image DS and the peripheral image PER2 as in the case in the above-mentioned first embodiment.

When it is expected that the left eye subtitle image DSL and/or the right eye subtitle image DSR will be adjacent to another subtitle image (the subtitle S2), the graphics engine 26 generates the part of the peripheral image PER2 by using the part of the above-mentioned another subtitle image in this way. Thus, it becomes possible for the observer to feel as if the degree of three-dimensionality is changed more smoothly and it becomes possible to reduce a fear that a space between the adjacent subtitles may be displayed unnaturally.

In the present embodiment, since the part of the peripheral image is generated using the part of the above-mentioned another subtitle image as described above when it is expected that the left eye subtitle image and/or the right eye subtitle image will be adjacent to another subtitle image, it becomes possible for the observer to feel as if the degree of three-dimensionality is changed more smoothly, it becomes possible to reduce the fear that the space between the adjacent subtitles may be displayed unnaturally, and it becomes possible to increase the image quality.

3. Application Example

In the following, an application example of the image processing device described in each of the above-mentioned embodiments and modification examples will be described.

Figure 17:
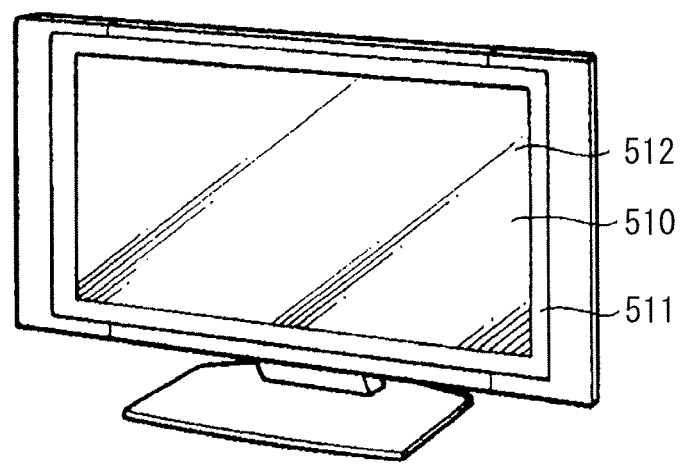
FIG. 17 is a perspective view illustrating an external appearance configuration of a television apparatus to which a display according to the embodiment is applied.

FIG. 17 illustrates the outer appearance of a television apparatus to which the image processing device described in each of the above-mentioned embodiments and modification examples is applied. The television apparatus may include, for example, an image display screen section 510 including a front panel 511 and filter glass 512. The image processing device according to each of the above-mentioned embodiments and modification examples is applied to the television apparatus.

The image processing device according to each of the above-mentioned embodiments and modification examples is applicable to electronic apparatus in all fields such as a head mounted display, a personal computer, a game machine and so forth in addition to such a television apparatus. In other words, the image processing device according to each of the above-mentioned embodiments and modification examples is applicable to the electronic apparatus that performs image processing in all fields.

Although the present disclosure has been described by giving the several embodiments, modification examples, and application example to the electronic apparatus, the present disclosure is not limited to the above-mentioned embodiments, modification examples, and application example and may be modified in a variety of ways.

Figure 18:
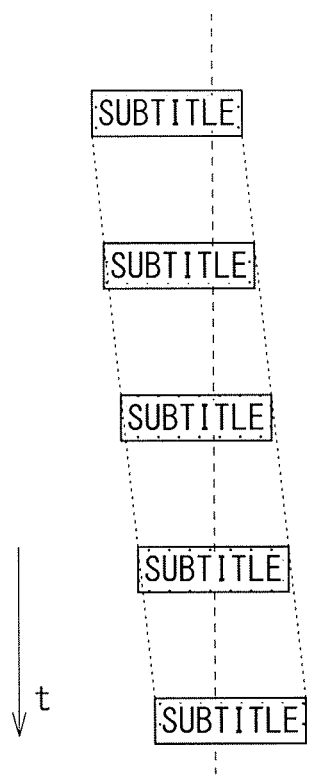
FIG. 18 is an explanatory diagram illustrating an operational example of a display system according to a modification example.
Figure 19:
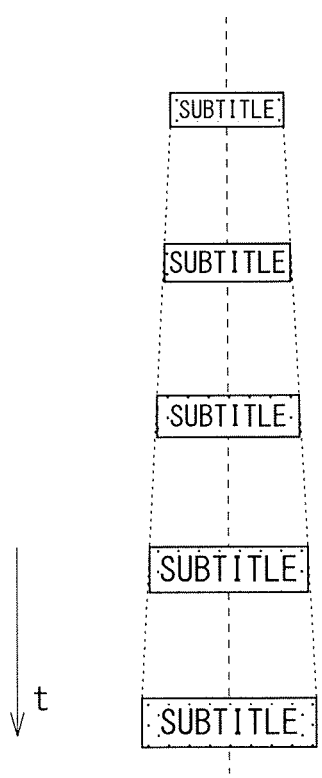
FIG. 19 is an explanatory diagram illustrating an operational example of a display system according to another modification example.

For example, although in each of the above-mentioned embodiments, the present disclosure has been applied to the three-dimensional display, the present disclosure is not limited thereto and may be applied to a two-dimensional display. Specifically, the present disclosure may be applied to cases that the subtitle is dynamically changed such as a case that the subtitle is moved, for example, from left to right on the display screen, for example, as illustrated in FIG. 18 and a case that the subtitle is gradually scaled up, for example, as illustrated in FIG. 19. As a result, it becomes possible for the observer to feel as if the subtitle is changed more smoothly.

In addition, although, for example, in each of the above-mentioned embodiments, the present disclosure has been applied to the three-dimensional display using the pair of shutter spectacles, the present disclosure is not limited thereto. Alternatively, the present disclosure may be applied to, for example, a display of a parallax barrier system.

It is possible to achieve at least the following configurations from the above-described example embodiments of the disclosure.

(1) An image processing device, including:
a sub-image generation section, the sub-image generation section configured to generate a third sub-image by providing a peripheral image including at least a first region that is a transparent region around a first sub-image and to perform a filtering process on the entire or a part of a second sub-image including the first sub-image and the peripheral image; and
a composition section configured to composite together a frame image and the third sub-image.

(2) The image processing device according to (1), wherein
each piece of pixel data configuring the second sub-image includes luminance information and transparency information, and
the sub-image generation section performs the filtering process on each of the luminance information and the transparency information.

(3) The image processing device according to (1) or (2), wherein
the entire peripheral image is the first region.

(4) The image processing device according to (1) or (2), wherein
the peripheral image includes a second region to be superimposed on another sub-image, and
the sub-image generation section replaces a luminance level of each pixel of the peripheral image with a luminance level of each corresponding pixel of the another sub-image in the second region and replaces a transparency level of each pixel of the peripheral image with a transparency level of each corresponding pixel of the another sub-image in the second region.

(5) The image processing device according to any one of (1) to (4), wherein
the third sub-image is a left eye sub-image or a right eye sub-image,
the frame image is a left eye frame image or a right eye frame image, and
the composition section composites the left eye sub-image to the left eye frame image and composites the right eye sub-image to the right eye frame image.
(6) The image processing device according to (5), wherein the left eye sub-image and the right eye sub-image move in mutually different directions with time.
(7) The image processing device according to any one of (1) to (6), wherein
the image processing device has a plurality of operation modes including a first operation mode, and
the sub-image generation section generates the third sub-image by providing the peripheral image around the first sub image and performing the filtering process on the entire or the part of the second sub-image including the first sub-image and the peripheral image in the first operation mode.
(8) The image processing device according to any one of (1) to (7), wherein
the first sub-image is to be displayed while dynamically moving and being scaled up or scaled down with time in a frame.
(9) The image processing device according to any one of (1) to (8), wherein
the first region is the lowest in luminance level and the highest in transparency level.
(10) An image processing method, including:
generating a third sub-image by providing a peripheral image including at least a first region that is a transparent region around a first sub-image and performing a filtering process on the entire or a part of a second sub-image including the first sub-image and the peripheral image; and
compositing together a frame image and the third sub-image.
(11) A display, including:
an image processing section; and
a display section displaying an image processed by the image processing section, wherein
the image processing section includes
a sub-image generation section, the sub-image generation section configured to generate a third sub-image by providing a peripheral image including at least a first region that is a transparent region around a first sub-image and to perform a filtering process on the entire or a part of a second sub-image including the first sub-image and the peripheral image; and
a composition section configured to composite together a frame image and the third sub-image.
(12) An electronic apparatus, including:
an image processing section; and
a control section controlling the operation of the image processing section,
wherein
the image processing section includes
a sub-image generation section, the sub-image generation section configured to generate a third sub-image by providing a peripheral image including at least a first region that is a transparent region around a first sub-image and to perform a filtering process on the entire or a part of a second sub-image including the first sub-image and the peripheral image; and
a composition section configured to composite together a frame image and the third sub-image.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device, comprising:
at least one processor configured to:
control a display device to display a left eye sub-image and a right eye sub-image,
generate a first sub-image that includes a second sub-image and a peripheral image around the second sub-image, wherein:
the peripheral image includes at least a first region and a second region,
the second region is superimposed on a third sub-image, and
the first region is a transparent region;
replace a first luminance level of each pixel of the second region of the peripheral image with a second luminance level of each corresponding pixel of the third sub-image;
replace a first transparency level of each pixel of the second region of the peripheral image with a second transparency level of each corresponding pixel of the third sub-image;
filter a part of the first sub-image by a low-pass filter process based on a displacement amount between a first display position of the left eye sub-image on the display device and a second display position of the right eye sub-image on the display device;
generate the left eye sub-image and the right eye sub-image based on the filter of the part of the first sub-image; and
composite a frame image, the generated left eye sub-image, and the generated right eye sub-image.

2. The image processing device according to claim 1, wherein:
each piece of pixel data of the first sub-image includes luminance information and transparency information, and
the at least one processor is further configured to filter each of the luminance information and the transparency information.

3. The image processing device according to claim 1, wherein an entire region of the peripheral image is the first region.

4. The image processing device according to claim 1, wherein:
the frame image is at least one of a left eye frame image or a right eye frame image, and
the at least one processor is further configured to:
composite the left eye sub-image to the left eye frame image; and
composite the right eye sub-image to the right eye frame image.

5. The image processing device according to claim 1, wherein the left eye sub-image and the right eye sub-image move in opposite directions with time.

6. The image processing device according to claim 1, wherein:
the image processing device has a plurality of operation modes that includes a first operation mode, and
the at least one processor is further configured to:
generate the first sub-image based on the peripheral image around the second sub-image; and filter the part of the first sub-image that includes the second sub-image and the peripheral image, wherein the part of the first sub-image is filtered in the first operation mode.

7. The image processing device according to claim 1, wherein the at least one processor is further configured to control display of the left eye sub-image and the right eye sub-image based on a dynamic movement of the left eye sub-image and the right eye sub-image with time, and one of a scale up or a scale down of the left eye sub-image and the right eye sub-image with time in a frame.

8. The image processing device according to claim 1, wherein the first region has a lowest luminance level and a highest transparency level.

9. An image processing method, comprising:
controlling a display device to display a left eye sub-image and a right eye sub-image;
generating a first sub-image that includes a second sub-image and a peripheral image around the second sub-image, wherein:
the peripheral image includes at least a first region and a second region,
the second region is superimposed on a third sub-image, and
the first region is a transparent region;
replacing a first luminance level of each pixel of the second region of the peripheral image with a second luminance level of each corresponding pixel of the third sub-image;
replacing a first transparency level of each pixel of the second region of the peripheral image with a second transparency level of each corresponding pixel of the third sub-image;
filtering a part of the first sub-image by a low-pass filter process based on a displacement amount between a first display position of the left eye sub-image on the display device and a second display position of the right eye sub-image on the display device;
generating the left eye sub-image and the right eye sub-image based on the filter of the part of the first sub-image; and
compositing a frame image, the generated left eye sub-image, and the generated right eye sub-image.

10. A display device, comprising:
at least one processor configured to:
control the display device to display a left eye sub-image and a right eye sub-image;
generate a first sub-image that includes a second sub-image and a peripheral image around the second sub-image, wherein:
the peripheral image includes at least a first region and a second region,
the second region is superimposed on a third sub-image, and
the first region is a transparent region;
replace a first luminance level of each pixel of the second region of the peripheral image with a second luminance level of each corresponding pixel of the third sub-image;
replace a first transparency level of each pixel of the second region of the peripheral image with a second transparency level of each corresponding pixel of the third sub-image;
filter a part of the first sub-image by a low-pass filter process based on a displacement amount between a first display position of the left eye sub-image on the display device and a second display position of the right eye sub-image on the display device;
generate the left eye sub-image and the right eye sub-image based on the filter of the part of the first sub-image; and
composite a frame image, the generated left eye sub-image, and the generated right eye sub-image.

11. An electronic apparatus, comprising:
an image processing device that comprises at least one processor, wherein the at least one processor is configured to:
control a display device to display a left eye sub-image and a right eye sub-image;
generate a first sub-image that includes a second sub-image and a peripheral image around the second sub-image, wherein:
the peripheral image includes at least a first region and a second region,
the second region is superimposed on a third sub-image, and
the first region is a transparent region;
replace a first luminance level of each pixel of the second region of the peripheral image with a second luminance level of each corresponding pixel of the third sub-image;
replace a first transparency level of each pixel of the second region of the peripheral image with a second transparency level of each corresponding pixel of the third sub-image;
filter a part of the first sub-image by a low-pass filter process based on a displacement amount between a first display position of the left eye sub-image on the display device and a second display position of the right eye sub-image on the display device;
generate the left eye sub-image and the right eye sub-image based on the filter of the part of the first sub-image; and
composite a frame image, the generated left eye sub-image, and the generated right eye sub-image.

12. The image processing device according to claim 1, wherein each of the generated left eye sub-image and the generated right eye sub-image is wider than the second sub-image.

* * * * *